United States Patent
Eto et al.

(10) Patent No.: US 10,962,066 B2
(45) Date of Patent: Mar. 30, 2021

(54) CLUTCH CONTROL DEVICE

(71) Applicant: Nidec Tosok Corporation, Zama (JP)

(72) Inventors: Takamitsu Eto, Zama (JP); Fumiya Sagara, Zama (JP)

(73) Assignee: Nidec Tosok Corporation, Kanagawa (JP)

(*) Notice: Subject to any disclaimer, the term of this patent is extended or adjusted under 35 U.S.C. 154(b) by 196 days.

(21) Appl. No.: 16/305,901

(22) PCT Filed: Jun. 21, 2017

(86) PCT No.: PCT/JP2017/022861
§ 371 (c)(1),
(2) Date: Nov. 30, 2018

(87) PCT Pub. No.: WO2017/221980
PCT Pub. Date: Dec. 28, 2017

(65) Prior Publication Data
US 2020/0318696 A1    Oct. 8, 2020

(30) Foreign Application Priority Data

Jun. 22, 2016  (JP) .............................. JP2016-123927

(51) Int. Cl.
*F16D 48/02*      (2006.01)
*F15B 1/02*       (2006.01)
(Continued)

(52) U.S. Cl.
CPC .............. *F16D 25/14* (2013.01); *F15B 1/021* (2013.01); *F15B 15/02* (2013.01); *F15B 15/20* (2013.01);
(Continued)

(58) Field of Classification Search
CPC ............. F16D 48/02; F16D 2048/0203; F16D 2048/0215; F16D 2048/0245;
(Continued)

(56) References Cited

U.S. PATENT DOCUMENTS 3,703,228 A  *  11/1972  Chana ...................... F16D 48/04
                                                    192/85.63
3,985,063 A  *  10/1976  Lemon .................... F16D 25/14
                                                         91/31
(Continued)

FOREIGN PATENT DOCUMENTS

CN       202811899 U     3/2013
CN       104074886 A    10/2014
(Continued)

OTHER PUBLICATIONS

Official Communication issued in International Patent Application No. PCT/JP2017/022861, dated Sep. 26, 2017.

*Primary Examiner* — Richard M Lorence
(74) *Attorney, Agent, or Firm* — Keating & Bennett (57) ABSTRACT

A clutch control device includes a pump to feed oil to a hydraulic clutch, an input side oil passage connecting an oil tank and the pump and through which oil sucked from the oil tank to the pump passes, and an output side oil passage connecting the pump and the hydraulic clutch and through which oil that is pressurized by the pump and is fed from the pump to the hydraulic clutch passes. A damper connected to the input side oil passage and the output side oil passage includes an oil container containing oil, a partition that partitions the oil container into first and second spaces along a predetermined direction and at least a portion of which is movable in the predetermined direction, a first connection oil passage connecting the first space and the input side oil passage, a second connection oil passage connecting the second space and the output side oil passage, and an elastic (Continued)

portion that applies a force to the partition to move the partition toward the second space in the predetermined direction. The first and second spaces are filled with oil.

9 Claims, 4 Drawing Sheets

(51) Int. Cl.
*F15B 15/02* (2006.01)
*F15B 15/20* (2006.01)

(52) U.S. Cl.
CPC ...... *F16D 48/02* (2013.01); *F16D 2048/0215* (2013.01)

(58) Field of Classification Search
CPC ....... F16D 2048/026; F16D 2048/0263; F16D 48/066; F16D 25/14; F15B 1/021; F15B 1/04; F15B 2201/21; F15B 2201/31; F15B 2201/413
See application file for complete search history.

(56) References Cited

U.S. PATENT DOCUMENTS

| | | | |
|---|---|---|---|
| 2003/0109360 A1 | 6/2003 | Eguchi et al. | |
| 2004/0159523 A1 | 8/2004 | Duan et al. | |
| 2005/0205138 A1* | 9/2005 | Sowul | F16D 48/04 137/596 |
| 2006/0016655 A1 | 1/2006 | Sakai et al. | |
| 2009/0064674 A1* | 3/2009 | Davidsson | F15B 21/044 60/422 |
| 2014/0020374 A1 | 1/2014 | Sugo et al. | |

FOREIGN PATENT DOCUMENTS

| | | |
|---|---|---|
| DE | 198 49 486 A1 | 5/2000 |
| DE | 11 2012 001 692 T5 | 1/2014 |
| JP | 57-147401 U | 9/1982 |
| JP | 7-239160 A | 9/1995 |
| JP | 2006-037991 A | 2/2006 |
| WO | 2012/141128 A1 | 10/2012 |

* cited by examiner

CLUTCH CONTROL DEVICE

BACKGROUND OF THE INVENTION

1. Field of the Invention

The present invention relates to a clutch control device.

2. Description of the Related Art

For example, Japanese Patent Laid-Open No. 2006-37991 discloses a lockup mechanism in which a substantially annular circumferential groove is provided in either a friction surface of a lockup clutch or an engagement surface of a front cover for the purpose of suppressing the occurrence of judder vibration.

However, the judder vibration also occurs because the pressure of the oil fed to a hydraulic clutch using a pump fluctuates and the force applied to the hydraulic clutch varies. In the configuration in which the circumferential groove is provided in the friction surface and the engagement surface as described above, there was a problem that it is impossible to suppress the judder vibration caused by the pressure fluctuation of the oil fed by the pump.

SUMMARY OF THE INVENTION

In view of the above problem, preferred embodiments of the present invention provide clutch control devices capable of reducing or preventing judder vibration caused by pressure fluctuation of oil fed to a hydraulic clutch.

A clutch control device according to one aspect of a preferred embodiment of the present invention is a clutch control device to control a hydraulic clutch, which includes a pump to feed oil to the hydraulic clutch; an input side oil passage that connects an oil tank and the pump and through which oil sucked from the oil tank to the pump passes; and an output side oil passage that connects the pump and the hydraulic clutch and through which oil that is pressurized by the pump and is fed from the pump to the hydraulic clutch passes, wherein the clutch control device further includes a damper connected to the input side oil passage and the output side oil passage, the damper including: an oil container in which oil is accommodated; a partition that partitions the inside of the oil container into a first space and a second space along a predetermined direction and at least a portion of which is movable in the predetermined direction; a first connection oil passage that connects the first space and the input side oil passage; a second connection oil passage that connects the second space and the output side oil passage; and an elastic portion that applies a force to the partition in a direction to move the partition toward the second space in the predetermined direction, the first space and the second space being filled with oil.

According to preferred embodiments of the present invention, clutch control devices capable of reducing or preventing judder vibration caused by pressure fluctuation of oil fed to a hydraulic clutch are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
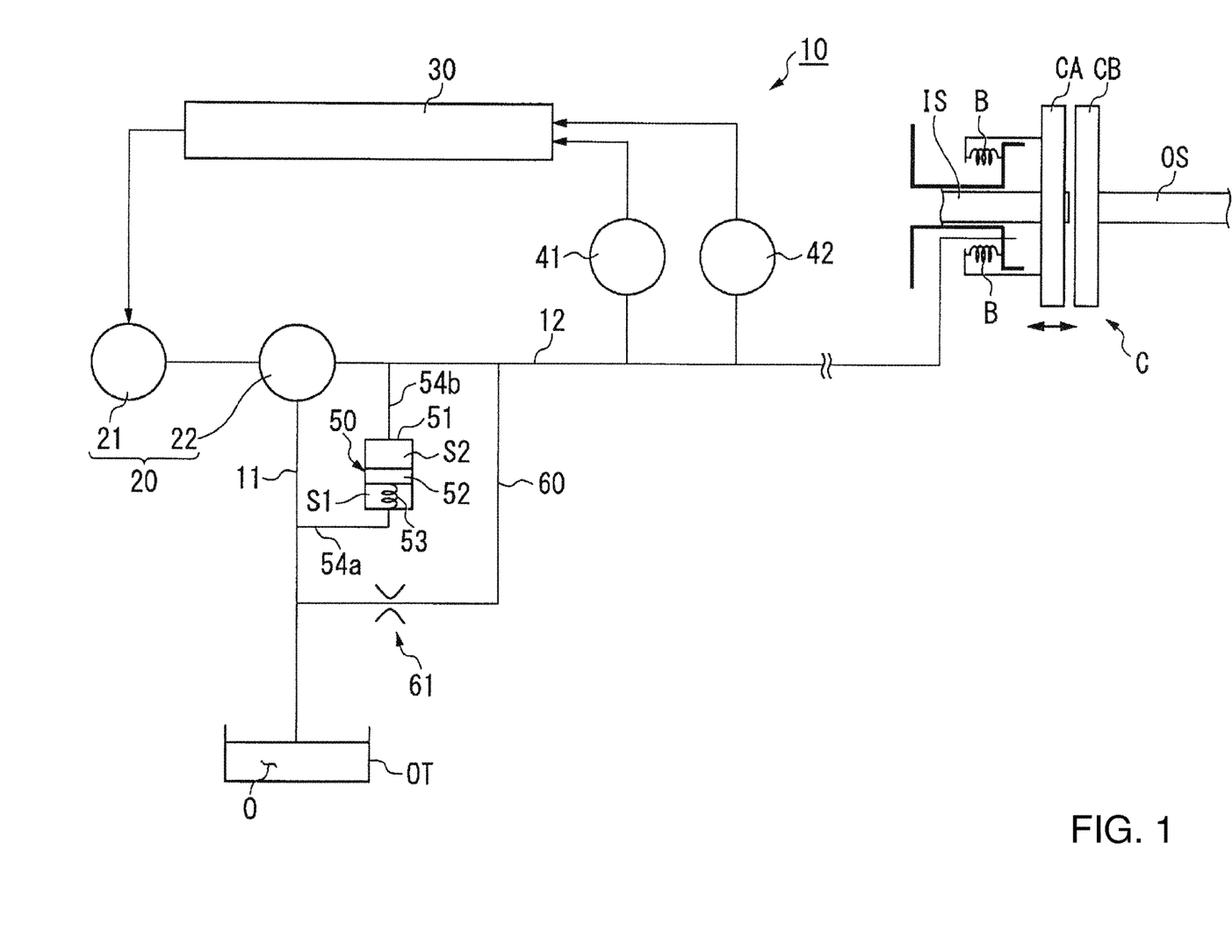
FIG. 1 is a schematic diagram showing a clutch control device according to a first preferred embodiment of the present invention.

As shown in FIG. 1, a clutch control device 10 of the present embodiment controls a hydraulic clutch C. The hydraulic clutch C switches connection and disconnection between a driving shaft IS and a driven shaft OS. FIG. 1 shows a state in which the driving shaft IS and the driven shaft OS are disconnected. The driving shaft IS and the driven shaft OS are coaxial with each other. In the following description, the direction parallel to a central axis of the driving shaft IS and a central axis of the driven shaft OS (the left to right direction in FIG. 1) may be simply referred to as an "axial direction." The hydraulic clutch C is mounted, for example, in a vehicle.

A first clutch plate CA is fixed to the driving shaft IS. A second clutch plate CB is fixed to the driven shaft OS. The first clutch plate CA and the second clutch plate CB are arranged to face each other. The driving shaft IS and the first clutch plate CA are arranged movably in the axial direction. A force is applied to the first clutch plate CA in a direction toward the second clutch plate CB by the clutch control device 10. As a result, the driving shaft IS and the first clutch plate CA move toward the driven shaft OS and the second clutch plate CB. When the first clutch plate CA moves and is connected to the second clutch plate CB, the driving shaft IS and the driven shaft OS are connected. As a result, the rotation of the driving shaft IS is transmitted to the driven shaft OS.

A spring B is connected to the first clutch plate CA. The spring B applies a force to the first clutch plate CA in a direction away from the second clutch plate CB. In this way, when the force applied to the first clutch plate CA by the clutch control device 10 becomes smaller than the spring B, the first clutch plate CA can be separated from the second clutch plate CB and the driving shaft IS and the driven shaft OS can be disconnected.

The clutch control device 10 includes a pump 20, an input side oil passage 11, an output side oil passage 12, a temperature sensor 41, a pressure sensor 42, and a controller 30. The pump 20 feeds oil O to the hydraulic clutch C. The pump 20 includes a driver 21 and a pump unit 22. The driver 21 drives the pump unit 22. The driver 21 is, for example, an electric motor. The driver 21 may be an engine.

The pump unit 22 is disposed between an oil tank OT in which the oil O is stored and the hydraulic clutch C. The pump unit 22 pressurizes the oil O stored in the oil tank OT by being driven by the driver 21, and feeds the oil O to the hydraulic clutch C. The configuration of the pump unit 22 is not particularly limited as long as it can feed the oil O. The clutch control device 10 applies a force toward the first clutch plate CA in the direction toward the second clutch plate CB in the axial direction by means of the pressure of the oil O fed by the pump 20.

The input side oil passage 11 connects the oil tank OT and the pump 20. More specifically, the input side oil passage 11 connects the oil tank OT and the pump unit 22. The oil O sucked from the oil tank OT to the pump 20 (pump unit 22) passes through the input side oil passage 11.

The output side oil passage 12 connects the pump 20 and the hydraulic clutch C. More specifically, the output side oil passage 12 connects the pump unit 22 and the hydraulic clutch C. The oil O pressurized by the pump 20 and sent from the pump 20 (pump unit 22) to the hydraulic clutch C passes through the output side oil passage 12.

The temperature sensor 41 and the pressure sensor 42 are connected to the output side oil passage 12. The temperature sensor 41 is connected to the output side oil passage 12 on the pump 20 side (upstream side) with respect to the position where the pressure sensor 42 is connected. The temperature sensor 41 is capable of measuring the temperature of the oil O in the output side oil passage 12. The configuration of the temperature sensor is not particularly limited as long as it can measure the temperature of the oil O in the output side oil passage 12. The pressure sensor 42 can measure the pressure of the oil O in the output side oil passage 12. The configuration of the pressure sensor 42 is not particularly limited as long as it can measure the pressure of the oil O in the output side oil passage 12.

The controller 30 controls the driver 21 of the pump 20. The temperature sensor 41 and the pressure sensor 42 are connected to the controller 30, and the measurement result of the temperature sensor 41 and the measurement result of the pressure sensor 42 are input thereto. Based on the temperature of the oil O in the output side oil passage 12 measured by the temperature sensor 41 and the pressure of the oil O in the output side oil passage 12 measured by the pressure sensor 42, the controller 30 controls the driver 21. The rotation speed of the driver 21 is controlled by the controller 30 and the pressure of the oil O sent to the hydraulic clutch C by the pump unit 22 can be controlled.

Figure 2:
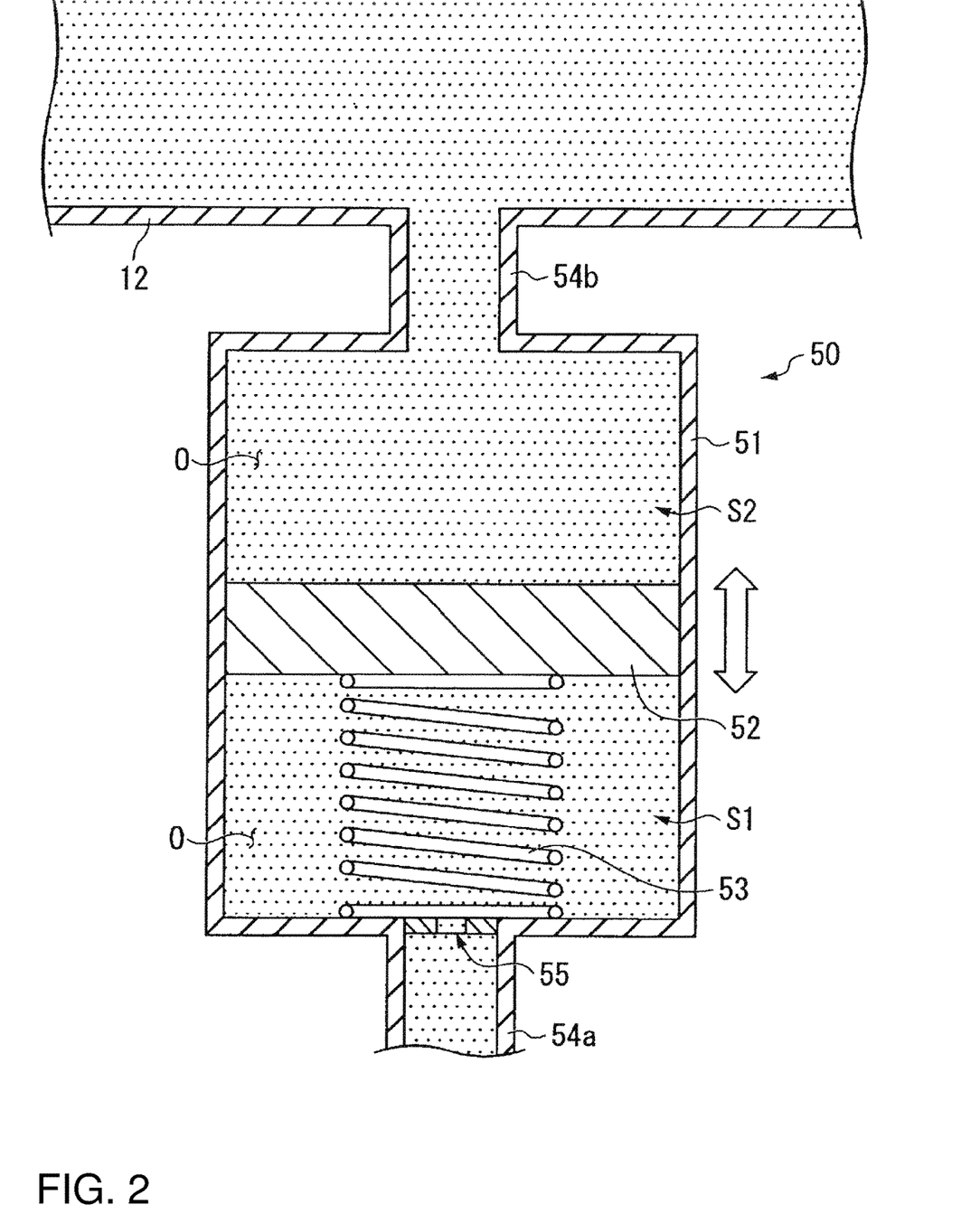
FIG. 2 is a cross-sectional view showing a damping device of the first preferred embodiment of the present invention.

The clutch control device 10 further includes a damping device 50. The damping device 50 is connected to the input side oil passage 11 and the output side oil passage 12. As shown in FIG. 2, the damping device 50 includes a cylinder 51, a piston 52, an elastic portion 53, a first connection oil passage 54a, and a second connection oil passage 54b.

The cylinder 51 is an accommodation member in which the oil O is accommodated. The cylinder 51 extends in a vertical direction. The cylinder 51 is, for example, cylindrical. The inside of the cylinder 51 is partitioned into a first space S1 and a second space S2 along the vertical direction (the vertical direction in the figure). The first space S1 is positioned on the lower side of the second space S2 in the vertical direction. The oil O is filled in the first space S1 and the second space S2.

The piston 52 is arranged inside the cylinder 51. The piston 52 has a shape of a disk extending in a plane orthogonal to the vertical direction. An outer circumferential surface of the piston 52 is in contact with an inner circumferential surface of the cylinder 51. The piston 52 is a partition member that partitions the inside of the cylinder 51 into the first space S1 and the second space S2 along the vertical direction and at least a part thereof can move in the vertical direction.

Herein, the meaning of the expression "at least a part of which can move in a predetermined direction" includes that a part of a certain object is deformed and can move in a predetermined direction, and that a whole of the certain object can move in a predetermined direction. In the present embodiment, the entire piston 52 can move inside the cylinder 51 along the vertical direction.

The elastic portion 53 applies a force to the piston 52 in a direction to move the piston 52 toward the second space S2 (vertically upward) in the vertical direction. In FIG. 2, the elastic portion 53 is disposed in the first space S1, and presses the piston 52 toward the second space S2 (vertically upward) in the vertical direction. Therefore, for example, by placing the elastic portion 53 in the cylinder 51 as a compression spring, an elastic force can be applied to the piston 52. As a result, the structure of the damping device 50 can be simplified, and the damping device 50 can be easily assembled.

Further, in the present embodiment, as described above, a predetermined direction in which the cylinder 51 extends is the vertical direction, and the first space S1 is positioned lower than the second space S2 in the vertical direction. For that reason, by merely disposing the elastic portion 53 in the first space S1 without fixing it to the cylinder 51 and the piston 52, the elastic portion 53 can be held between the inner wall on the lower side in the vertical direction of the cylinder 51 and the piston 52 due to the weight of the piston 52. Therefore, the damping device 50 can be more easily assembled.

In the present embodiment, the elastic portion 53 is, for example, a compression spring. A lower end of the elastic portion 53 is in contact with the inner wall on the lower side of the cylinder 51 in the vertical direction. An upper end of the elastic portion 53 is in contact with a lower surface of the piston 52.

As shown in FIG. 1, the first connection oil passage 54a connects the first space S1 and the input side oil passage 11. As shown in FIG. 2, the first connection oil passage 54a is connected to the lower end of the cylinder 51. The second connection oil passage 54b connects the second space S2 and the output side oil passage 12. The second connection oil passage 54b is connected to the upper end of the cylinder 51.

When the pump unit 22 is driven by the driver 21, the oil O fed by the pump unit 22, that is, the oil O in the output side oil passage 12 vibrates due to the rotation of the driver 21, and the pressure of the oil O varies periodically. In this state, when the first clutch plate CA and the second clutch plate CB are in contact with each other, the force applied to the first clutch plate CA by the oil O fluctuates, thereby causing judder vibration. When judder vibration occurs, for example, in the case that the hydraulic clutch C is mounted in the vehicle, vibrations are transmitted to the vehicle, which impairs the comfort of the passenger of the vehicle. In particular, when the hydraulic clutch C is in a half clutch state, the rotation speed of the driver 21 tends to be an uncomfortable vibration for human beings, which further impairs the passenger's comfort of the vehicle. The rotation speed of the driver 21 when the hydraulic clutch C is in the half clutch state is, for example, about 400 rpm, and the frequency of the judder vibration generated at this time is about 6 Hz or more and about 7 Hz or less.

In response to the above problem, according to the present embodiment, when the pressure of the oil O in the output side oil passage 12 fluctuates, the volume of the second space S2 varies in the damping device 50. Specifically, for example, when the pressure of the oil O in the output side oil passage 12 increases, the pressure of the oil O in the second space S2 connected to the output side oil passage 12 via the second connection oil passage 54b increases. Therefore, the piston 52 moves downward in the vertical direction, and the volume of the second space S2 increases. When the piston 52 moves to the lower side in the vertical direction, the elastic portion 53 is compressed, and the vertical upward force applied to the piston 52 by the elastic portion 53 is increased. When the forces in the vertical direction applied to the piston 52 balance each other, the movement of the piston 52 stops.

When the volume of the second space S2 increases, the oil O in the output side oil passage 12 flows into the second space S2 through the second connection oil passage 54*b*. When the oil O passes through the second connection oil passage 54*b*, the oil O is subjected to resistance, whereby a damping force proportional to the square of the flow velocity of the oil O is generated. As the volume of the second space S2 increases, the volume of the first space S1 decreases. As a result, the oil O in the first space S1 flows into the input side oil passage 11 through the first connection oil passage 54*a*. When the oil O passes through the first connection oil passage 54*a*, the oil O is subjected to resistance, thereby generating a damping force proportional to the square of the flow velocity of the oil O.

On the other hand, as the pressure of the oil O in the output side oil passage 12 decreases, the volume of the second space S2 decreases and the volume of the first space S1 increases. As a result, the oil O passes through the first connection oil passage 54*a* and the second connection oil passage 54*b* in the same manner as described above, and a damping force is generated.

In this manner, the damping force corresponding to the pressure fluctuation of the oil O in the output side oil passage is generated by the damping device 50, whereby pressure fluctuation of the oil O in the output side oil passage 12 can be suppressed. Therefore, it is possible to suppress the judder vibration caused by the pressure fluctuation of the oil O fed to the hydraulic clutch C.

In the present embodiment, the accommodation member is the cylinder 51, and the partition member is the piston 52. For that reason, it is possible to partition the inside of the cylinder 51 into the first space S1 and the second space S2 with a simple structure and to change the volume of the first space S1 and the volume of the second space S2 by the movement of the piston 52. Since the structure of the damping device 50 can be simplified, the manufacturing costs of the damping device 50 can be reduced.

The first connection oil passage 54*a* has a first orifice portion 55. The first orifice portion 55 is a portion where the cross-sectional area of the first connection oil passage 54*a* is reduced. For that reason, when the volume of the first space S1 and the volume of the second space S2 change, the oil O passes through the first orifice portion 55, whereby the oil O is subjected to more resistance. In this way, it is possible to more appropriately apply the damping force to the oil O in the output side oil passage 12 and to further suppress the judder vibration.

In FIG. 2, the first orifice portion 55 is disposed at an end portion of the first connection oil passage 54*a* on the end of the first space S1. The first orifice portion 55 is formed by, for example, a hole provided in a circular plate fitted in the first connection oil passage 54*a*. The position of the first orifice portion 55 in the first connection oil passage 54*a* is not particularly limited.

As shown in FIG. 1, the damping device 50, more specifically, the second connection oil passage 54*b*, is connected to the output side oil passage 12 on the pump 20 side (upstream side) with respect to the position where the pressure sensor 42 is connected. For that reason, the pressure of the oil O after the pressure is adjusted by the damping device 50 can be measured by the pressure sensor 42. In this way, the controller 30 can control the driver 21 more accurately. The damping device 50, more particularly, the second connection oil passage 54*b*, is connected to the output side oil passage 12 on the pump 20 side (upstream side) with respect to the position where the temperature sensor 41 is connected.

The damping device 50 further includes a pressure adjustment oil passage 60. The pressure adjustment oil passage 60 connects the output side oil passage 12 and the input side oil passage 11. The portion of the output side oil passage 12 to which the pressure adjustment oil passage 60 is connected, is on the hydraulic clutch C side (downstream side) with respect to the position to which the damping device 50 is connected and on the pump 20 side (upstream side) with respect to the position where the temperature sensor 41 and the pressure sensor 42 are connected. The portion of the input side oil passage 11 connected to the pressure adjustment oil passage 60 is positioned on the oil tank OT side (upstream side) with respect to the portion to which the damping device 50, more specifically, the first connection oil passage 54*a* is connected.

The pressure adjustment oil passage 60 has a second orifice portion 61. The second orifice portion 61 is a portion where the cross-sectional area of the pressure adjustment oil passage 60 is reduced. For that reason, a part of the oil O can be discharged from the inside of the output side oil passage 12 while maintaining the pressure of the oil O in the output side oil passage 12 to some extent. In this way, it is possible to restrain the pressure of the oil O in the output side oil passage 12 from becoming too large, and it is possible to suppress a high load from being applied to the driver 21.

The configuration of the second orifice portion 61 is not particularly limited, and may be, for example, the same configuration as the first orifice portion 55 of the first connection oil passage 54*a*.

The present invention is not limited to the above-described embodiment, and other configurations may be adopted. It should be noted that the same reference numerals are attached to the same configurations as those in the above embodiment, and the explanations thereof may be omitted in some cases.

The portion where the damping device 50 is connected to the output side oil passage 12, that is, the portion where the second connection oil passage 54*b* is connected to the output side oil passage 12, may be on the hydraulic clutch C side (downstream side) with respect to the position where the temperature sensor 41 and the pressure sensor 42 are connected to the output side oil passage 12.

The elastic portion 53 may be disposed in the second space S2. In a damping device 150 shown in FIG. 3, an elastic portion 153 is disposed in the second space S2 and pulls the piston 52 toward the second space S2 (vertically upward) in the vertical direction. Therefore, for example, by placing the elastic portion 153 in the cylinder 51 as a tension spring, an elastic force can be applied to the piston 52. As a result, the structure of the damping device 150 can be simplified and the damping device 150 can be easily assembled.

Figure 3:
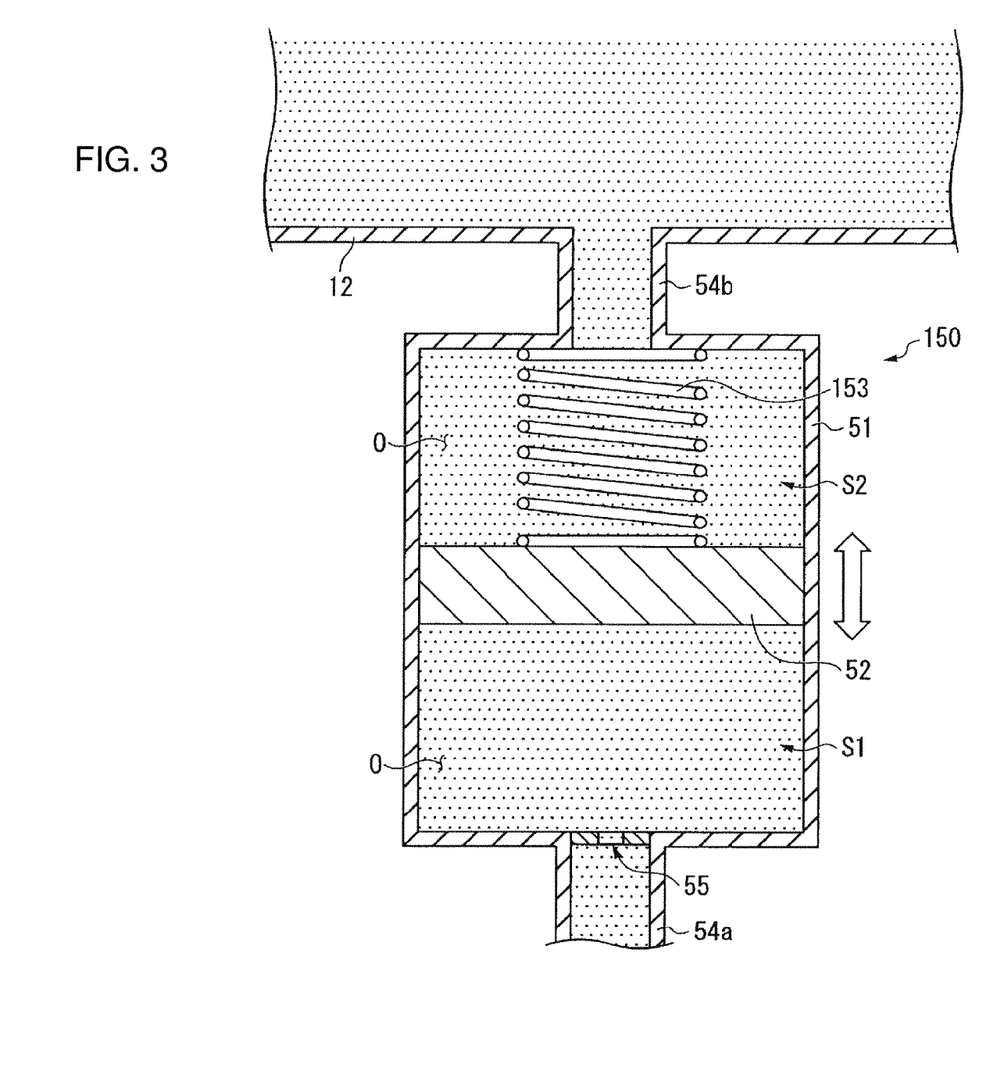
FIG. 3 is a cross-sectional view showing a damping device which is another example of the first preferred embodiment of the present invention.

The elastic portion 153 is, for example, a tension spring. The upper end of the elastic portion 153 is fixed to the inner wall of the cylinder 51 on the upper side in the vertical direction. The lower end of the elastic portion 153 is fixed to the upper surface of the piston 52.

Further, the elastic portions 53 and 153 are not particularly limited as long as a force can be applied to the piston 52 in a direction to move the piston 52 toward the second space S2 in the vertical direction, and the elastic portion 53, 153 is not limited to a spring.

Further, the pressure adjustment oil passage 60 may connect the output side oil passage 12 and the oil tank OT.

In addition, a gap may be provided between the outer circumferential surface of the piston 52 and the inner circumferential surface of the cylinder 51. In that case, the oil O in the second space S2 may flow into the first space S1 via the gap between the outer circumferential surface of the piston 52 and the inner circumferential surface of the cylinder 51. Here, the gap between the outer circumferential surface of the piston 52 and the inner circumferential surface of the cylinder 51 is a sufficiently small gap to the extent that the pressure of the oil O in the second space S2 is maintained.

Further, the partition member may be a bellows, a diaphragm, or the like. In this case, when the pressure of the oil O in the second space S2 varies, for example, a part of the partition member deforms and moves in the vertical direction. As a result, the volume of the first space S1 and the volume of the second space S2 are changed, and the damping force is obtained as described above. In addition, the accommodation member is not particularly limited as long as the accommodation member accommodates the oil O and is partitioned into the first space S1 and the second space S2 by the partition member.

In the above description, the predetermined direction in which the inside of the cylinder 51 as the accommodation member is partitioned into the first space S1 and the second space S2 is the vertical direction, but the present invention is not limited thereto. The predetermined direction is not particularly limited, and may be any direction other than the vertical direction.

Figure 4:
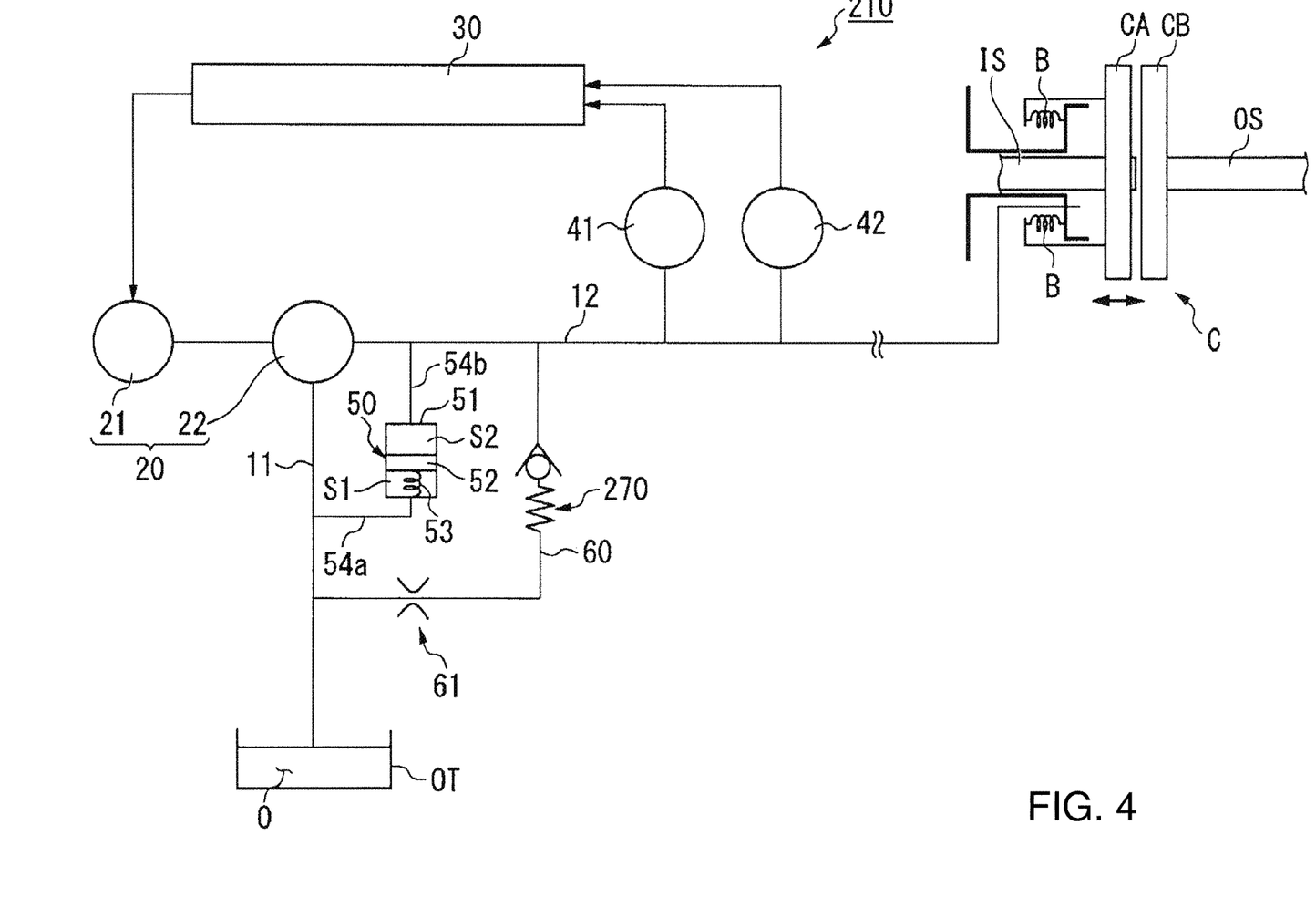
FIG. 4 is a schematic diagram showing a clutch control device according to a second preferred embodiment of the present invention.

As shown in FIG. 4, a clutch control device 210 of the present embodiment further includes a valve 270 disposed in the pressure adjustment oil passage 60. When the pressure of the oil O in the output side oil passage 12 is a predetermined value or less, the valve 270 blocks the flow of the oil O in the pressure adjustment oil passage 60, and when the pressure of the oil O in the output side oil passage 12 is larger than the predetermined value, the flow of the oil O in the pressure adjustment oil passage 60 is allowed. For that reason, it is possible to prevent the oil O from being discharged from the inside of the output side oil passage 12 via the pressure adjustment oil passage 60 when the pressure of the oil O in the output side oil passage 12 is the predetermined value or less. In this way, it is possible to prevent the oil O from being discharged more than necessary and waste of the oil O supplied to the hydraulic clutch C by the pump 20 can be reduced. Therefore, the efficiency of the pump 20 can be improved.

The predetermined value is, for example, a value slightly smaller than the pressure of the oil O at which the hydraulic clutch C is in the half clutch state. When the pressure of the oil O in the output side oil passage 12 is less than or equal to such the predetermined value, the rotation number of the driver 21 is relatively small, and the flow rate of the oil O supplied by the pump 20 is relatively small. In such a case, even if the oil O in the output side oil passage 12 is not discharged by the pressure adjustment oil passage 60, a small amount of the oil O leaks from the hydraulic clutch C, whereby the pressure of the oil O in the output side oil passage 12 can be suppressed from becoming too large. Therefore, by blocking the pressure adjustment oil passage 60 using the valve 270 when the rotation number of the driver 21 is relatively small, it is possible to improve the efficiency of the pump 20 while suppressing a high load from being applied to the driver 21.

The valve 270 is disposed closer to the output side oil passage 12 side than the second orifice portion 61 in the pressure adjustment oil passage 60. Incidentally, the valve 270 may be disposed closer to the input side oil passage 11 side than the second orifice portion 61 in the pressure adjustment oil passage 60.

The valve 270 is formed, for example, by a ball-shaped valve element pressed against a valve seat by a spring. When a pressure larger than a predetermined value is applied to a valve body, the valve body separates from the valve seat against the elastic force of the spring to allow the flow of the oil O in the pressure adjustment oil passage 60. The flow of the oil O in the pressure adjustment oil passage 60 allowed by the valve 270 is only the flow from the output side oil passage 12 to the input side oil passage 11.

The type of hydraulic clutch to which the clutch control device according to each of the above-described embodiments is applied is not particularly limited and may be applied to any type of hydraulic clutch. Further, the hydraulic clutch is not limited to a hydraulic clutch mounted in a vehicle.

Further, each of the above-described configurations can be appropriately combined within a range in which they do not conflict with each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch control device for controlling a hydraulic clutch, comprising:
   a pump to feed oil to the hydraulic clutch;
   an input side oil passage which connects an oil tank and the pump and through which oil suctioned from the oil tank to the pump passes; and
   an output side oil passage which connects the pump and the hydraulic clutch and through which oil that is pressurized by the pump and is fed from the pump to the hydraulic clutch passes, wherein
   the clutch control device further includes a damping device which is connected to the input side oil passage and the output side oil passage,
   the damping device includes:
      an accommodation member in which oil is accommodated;
      a partition member which partitions an inside of the accommodation member into a first space and a second space along a predetermined direction and at least a portion of which is movable in the predetermined direction;
      a first connection oil passage which connects the first space and the input side oil passage;
      a second connection oil passage which connects the second space and the output side oil passage; and
      an elastic portion which applies a force to the partition member in a direction to move the partition member toward the second space in the predetermined direction,
   the first connection oil passage is connected to one side of the accommodation member,
   the second connection oil passage is connected to another side of the accommodation member, the another side being opposite to the one side, and
   the first space and the second space are filled with oil.

2. The clutch control device according to claim 1, wherein the first connection oil passage includes a first orifice portion in which a cross-sectional area of the first connection oil passage is reduced.

3. The clutch control device according to claim 1,
wherein the accommodation member is a cylinder which extends in the predetermined direction, and the partition member is a piston whose entirety is movable inside the cylinder along the predetermined direction.

4. The clutch control device according to claim 3,
wherein the elastic portion is disposed in the first space and presses the piston toward the second space in the predetermined direction.

5. The clutch control apparatus according to claim 4,
wherein the predetermined direction is a vertical direction, and
the first space is positioned on a lower side of the second space in the vertical direction.

6. The clutch control device according to claim 3,
wherein the elastic portion is disposed in the second space and pulls the piston toward the second space in the predetermined direction.

7. The clutch control device according to claim 1, further comprising:
a pressure adjustment oil passage which connects the output side oil passage and the oil tank or connects the output side oil passage and the input side oil passage, wherein
the pressure adjustment oil passage includes a second orifice portion in which the cross-sectional area of the pressure adjustment oil passage is reduced.

8. The clutch control device according to claim 7, further comprising:
a valve which is disposed in the pressure adjustment oil passage,
wherein the valve blocks the flow of the oil in the pressure adjustment oil passage when the pressure of the oil in the output side oil passage is a predetermined value or less, and allows the flow of the oil in the pressure adjustment oil passage when the pressure of the oil in the output side oil passage is larger than the predetermined value.

9. The clutch control device according to claim 1, further comprising:
a controller which controls a driver of the pump; and
a pressure sensor which is connected to the output side oil passage and is capable of measuring a pressure of oil in the output side oil passage,
wherein the controller controls the driver based on the pressure of the oil in the output side oil passage measured by the pressure sensor, and
the damping device is connected to the output side oil passage on the pump side with respect to a position where the pressure sensor is connected.

* * * * *